(12) United States Patent
Lee et al.

(10) Patent No.: US 7,782,545 B2
(45) Date of Patent: Aug. 24, 2010

(54) ZOOM LENS ASSEMBLY AND ZOOM LENS MODULE

(75) Inventors: Tsu-Meng Lee, Taichung (TW); Hui-Chuan Kuo, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 32 days.

(21) Appl. No.: 12/409,728

(22) Filed: Mar. 24, 2009

(65) Prior Publication Data
US 2010/0091383 A1   Apr. 15, 2010

(30) Foreign Application Priority Data
Oct. 9, 2008   (TW) ............................... 97138907 A

(51) Int. Cl.
*G02B 15/14*   (2006.01)
*G02B 7/02*   (2006.01)

(52) U.S. Cl. ........................ 359/691; 359/692; 359/717; 359/699; 359/700; 359/701; 359/702; 359/703; 359/704; 359/705; 359/706; 359/793; 359/822; 359/823

(58) Field of Classification Search ................ 359/691, 359/692, 717, 699–706, 793, 822, 823
See application file for complete search history.

(56) References Cited

U.S. PATENT DOCUMENTS

| 5,515,210 | A * | 5/1996 | Devenyi ..................... 359/823 |
| 5,870,232 | A * | 2/1999 | Tsuji et al. .................. 359/700 |
| 6,618,212 | B2 * | 9/2003 | Chikami et al. ............. 359/699 |
| 7,199,944 | B2 * | 4/2007 | Cheng et al. ................ 359/699 |
| 7,292,396 | B2 * | 11/2007 | Ito et al. ...................... 359/703 |
| 7,414,801 | B2 * | 8/2008 | Honsho ...................... 359/822 |
| 7,518,806 | B2 * | 4/2009 | Hu et al. ..................... 359/699 |
| 7,589,919 | B2 * | 9/2009 | Chiang ....................... 359/823 |
| 7,729,067 | B2 * | 6/2010 | Kuo et al. ................... 359/823 |
| 2007/0139790 | A1 * | 6/2007 | Cheng et al. ................ 359/699 |

* cited by examiner

Primary Examiner—Evelyn A. Lester
(74) Attorney, Agent, or Firm—Thomas, Kayden, Horstemeyer & Risley

(57) ABSTRACT

A zoom lens assembly and zoom lens module are provided, including a first lens, a second lens, a plurality of guiding blocks, a sheathing tube, a plurality of linking members and an adjusting tube. The first lens includes a plurality of curved surfaces disposed on a second lens surface toward a first lens surface. The second lens includes a plurality of driving rods disposed on a third lens surface and abutting the curved surfaces. The guiding blocks are respectively fixed on the first lens. The sheathing tube sheathes the first lens and the second lens and comprises a plurality of guiding notches to receive the guiding blocks, and a plurality of slits. The linking members pass through the slits and are fixed on the second lens. The adjusting tube sheathes the sheathing tube and comprises a plurality of driving notches to receive the linking members.

9 Claims, 9 Drawing Sheets

ZOOM LENS ASSEMBLY AND ZOOM LENS MODULE

This Application claims priority of Taiwan Patent Application No. 097138907, filed on Oct. 9, 2008, the entirety of which is incorporated by reference herein.

BACKGROUND OF THE INVENTION

1. Field of the Invention

The invention relates to an optical instrument assembly, and in particular, to a zoom lens assembly and a zoom lens module.

2. Description of the Related Art

As shown in FIGS. 1 and 2, a focusing device 10 often assembled on an optical image device (for example, a camera and a projector) has functions of zooming and focusing. The focusing device 10 has a first frame set 11 along an axis I, a second frame set 12, a fixing tube 13 sheathing the first frame set 11 and the second frame set 12, a first cam tube 14 and a second cam tube 15 sheathing the fixing tube 13, three first driving bolts 16 and three second driving bolts 17.

The first frame set 11 has a through space 111 along the axis I to receive a first lens group (not shown), and three tap holes 112 disposed radially at intervals of equal angle.

The second frame set 12 has a through space 121 along the axis I to receive a second lens group (not shown), and three tap holes 122 disposed radially at intervals of equal angle.

The fixing tube 13 has three first guiding notches 131 disposed along the axis I aligning to the tap holes 112, and three second guiding notches 132 disposed along the axis I aligning to the tap holes 122.

The first cam tube 14 has three cam grooves 141 corresponding to the tap holes 112.

The second cam tube 15 has three cam groove 151 corresponding to the tap holes 122.

The first driving bolts 16 respectively pass through the cam grooves 141, the first guiding notches 131 and then screws into the radial tap holes 112.

The second driving bolts 17 respectively pass through the cam grooves 151, the second guiding notches 132 and then screws into the radial tap holes 122.

For adjustment, the first cam tube 14 is rotated, so that the cam grooves 141 drive the first driving bolts 16 to move in the first guiding grooves 131, further moving the first frame set 11 close to or away from the second frame set 12 along the axis I. Relatively, the distance between the first lens group and the second lens group can be changed to achieve zooming purposes.

Moreover, rotating the second cam tube 15 to drive the second frame set 12 to move along the axis I also achieves zooming purposes.

Although the focusing device 10 comprises the above functions, the following disadvantages still exist.

First, the focusing device 10 requires many components which increases the manufacturing costs.

Second, since the first frame set 11 is necessary to receive the first lens group and the second frame 12 is necessary to receive the second lens group, more radial space is necessary, the size of the focusing device 10 is relatively large

BRIEF SUMMARY OF THE INVENTION

Accordingly, the invention provides a zoom lens assembly and a zoom lens module with reduced components and a small size.

The zoom lens assembly comprises a first lens and a second lens.

The first lens comprises a first lens surface and a second lens surface opposite to each other along an axis, a first effective radius around the axis and a plurality of curved surfaces disposed on the second lens surface toward the first lens surface.

The second lens is disposed on a side of the first lens along the axis, comprising a third lens surface facing the second lens surface, a fourth lens surface opposite to the third lens surface, a second effective radius around the axis, and a plurality of first driving rods disposed on the third lens surface and abutting the curved surfaces.

The first lens and the second lens rotate relatively along the axis to generate zoom effect.

The invention provides a zoom lens module comprises a first lens, a second lens, a plurality of guiding blocks, a sheathing tube, a plurality of linking member and an adjusting tube.

The first lens comprises a first lens surface and a second lens surface opposite to each other along an axis, a first connecting surface connecting the first lens surface and the second lens surface, a first effective radius around the axis, and a plurality of curved surfaces disposed on the second surface toward the first lens surface.

The second lens is disposed on a side of the first lens along the axis, comprising a third lens surface facing the second lens surface, a fourth lens surface opposite to the third lens surface, a second connecting surface connecting the third lens surface and the fourth lens surface, a second effective radius around the axis, and a plurality of driving rods disposed on the third lens surface and abutting the curved surfaces.

The guiding blocks is fixed on one of the first connecting surface and the second connecting surface.

The sheathing tube, sheathing the first lens and the second lens, comprises an inner surface and an outer surface having different diameters, a plurality of guiding notches disposed on the inner surface along the axis to receive the guiding blocks, and a plurality of slits communicating the outer surface with the inner surface.

The linking members pass through the slits along a radial direction and are fixed on another one of the first connecting surface and the second connecting surface.

The adjusting tube, sheathing the sheathing tube, comprises an inner surface and an outer surface having different diameters, and a plurality of driving notches disposed on the inner surface of the adjusting tube along the axis to receive the linking members.

Thus, by rotating the adjusting tube, the distance between the first lens and the second lens is changed to generate zooming effects.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
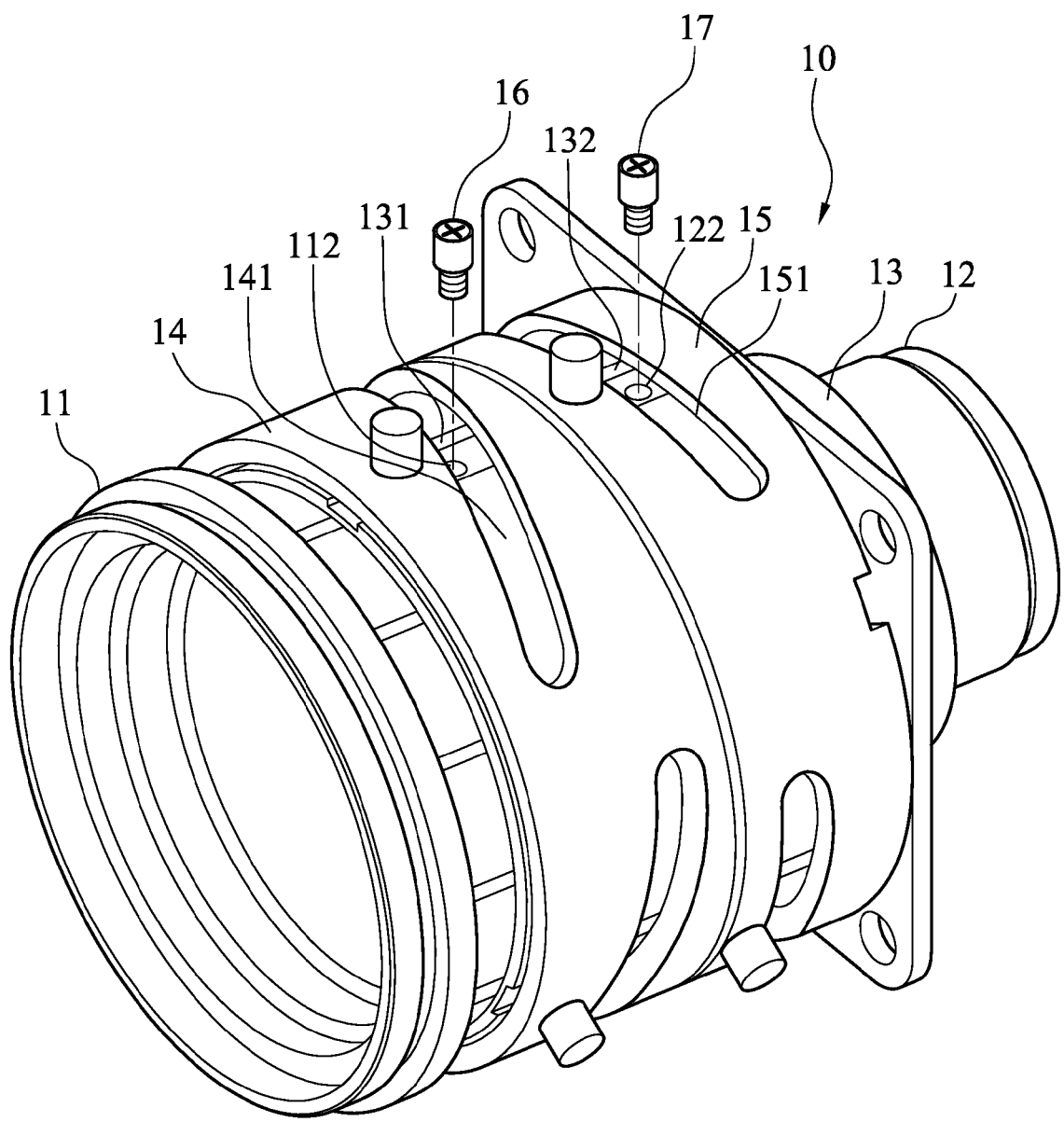
FIG. 1 is a schematic view of a conventional focusing device.
Figure 2:
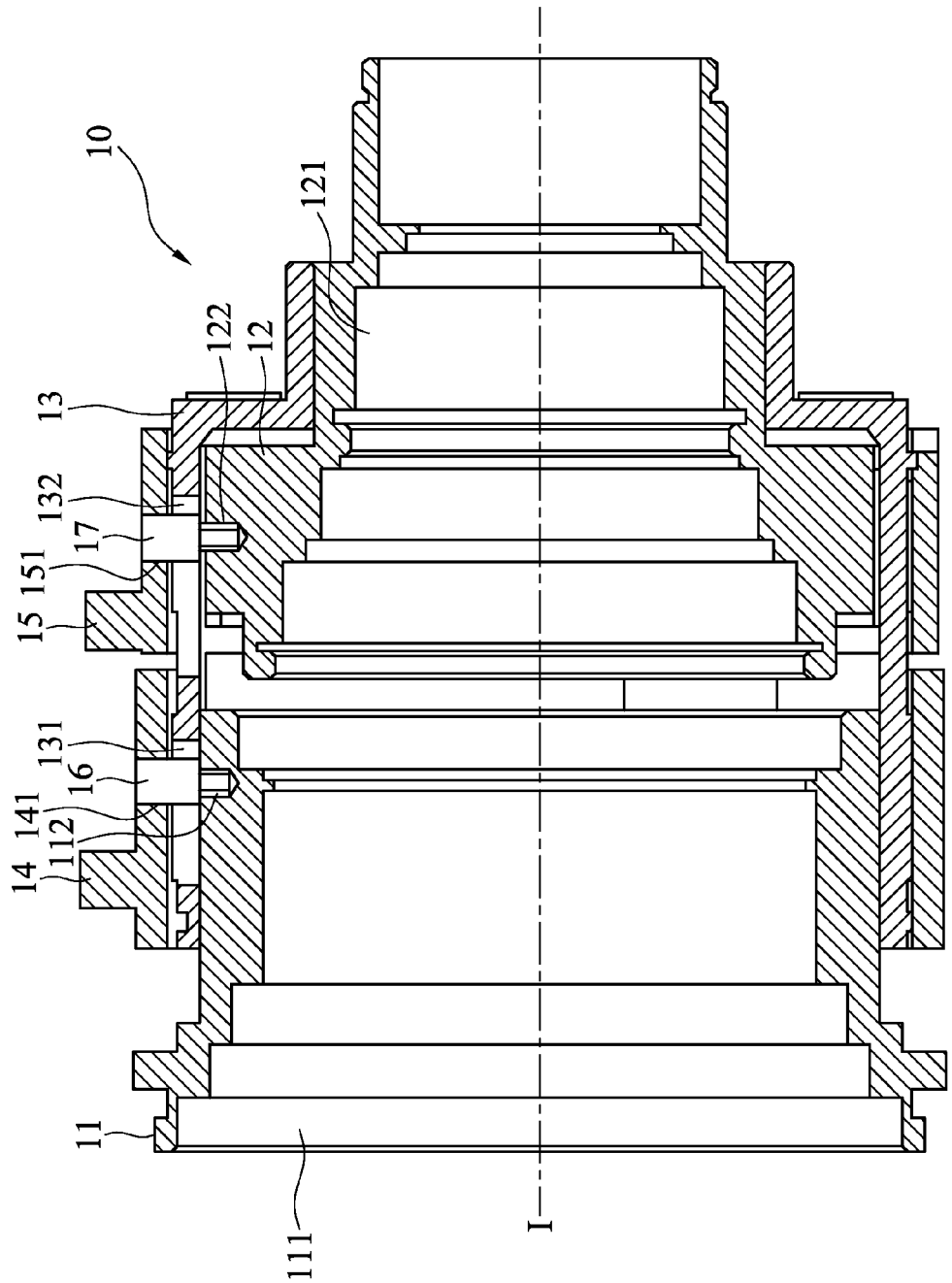
FIG. 2 is a sectional view of the conventional focusing device.
Figure 3:
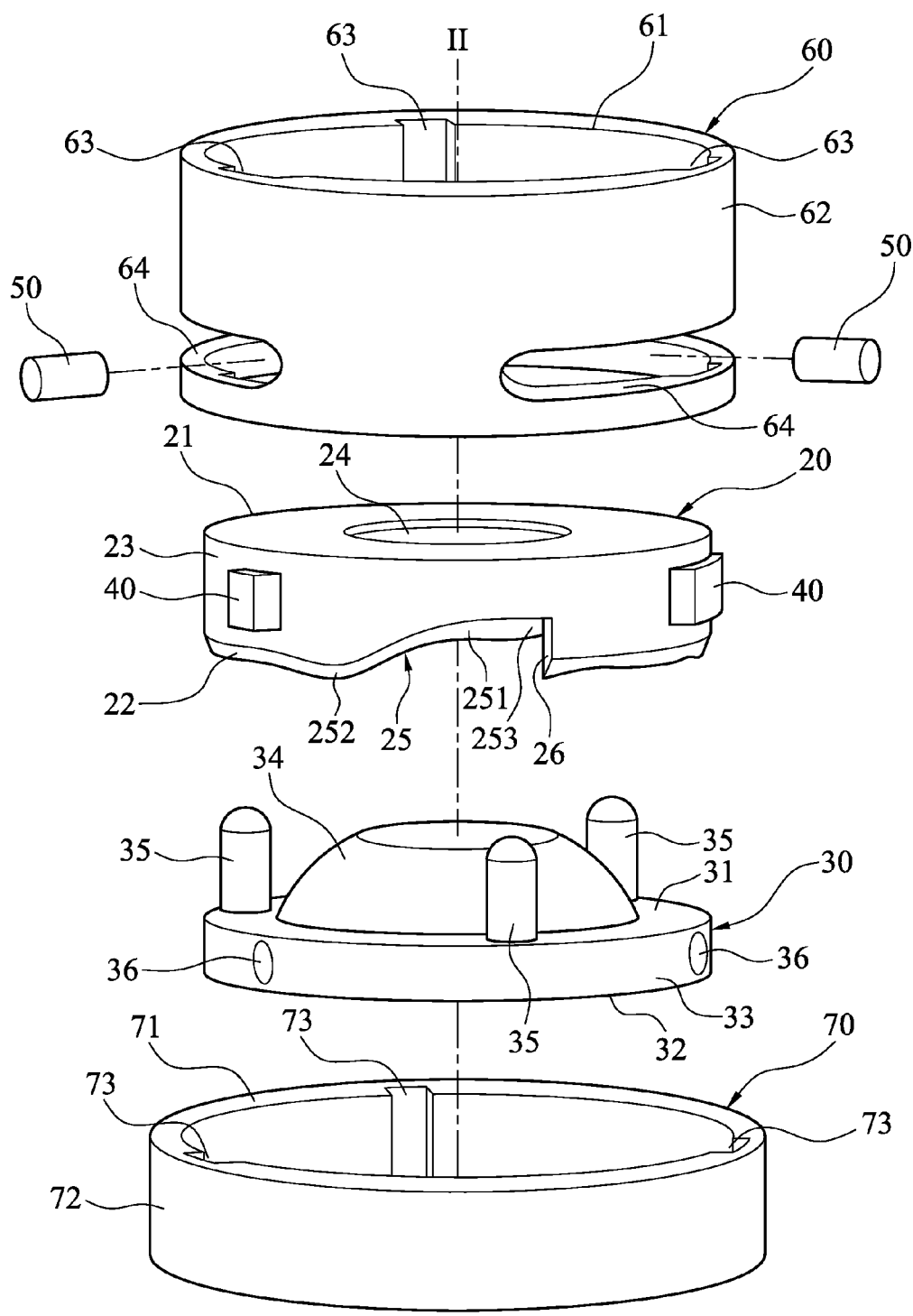
FIG. 3 is an exploded view of a preferred embodiment of a zoom lens assembly/zoom lens module of the invention.
Figure 4:
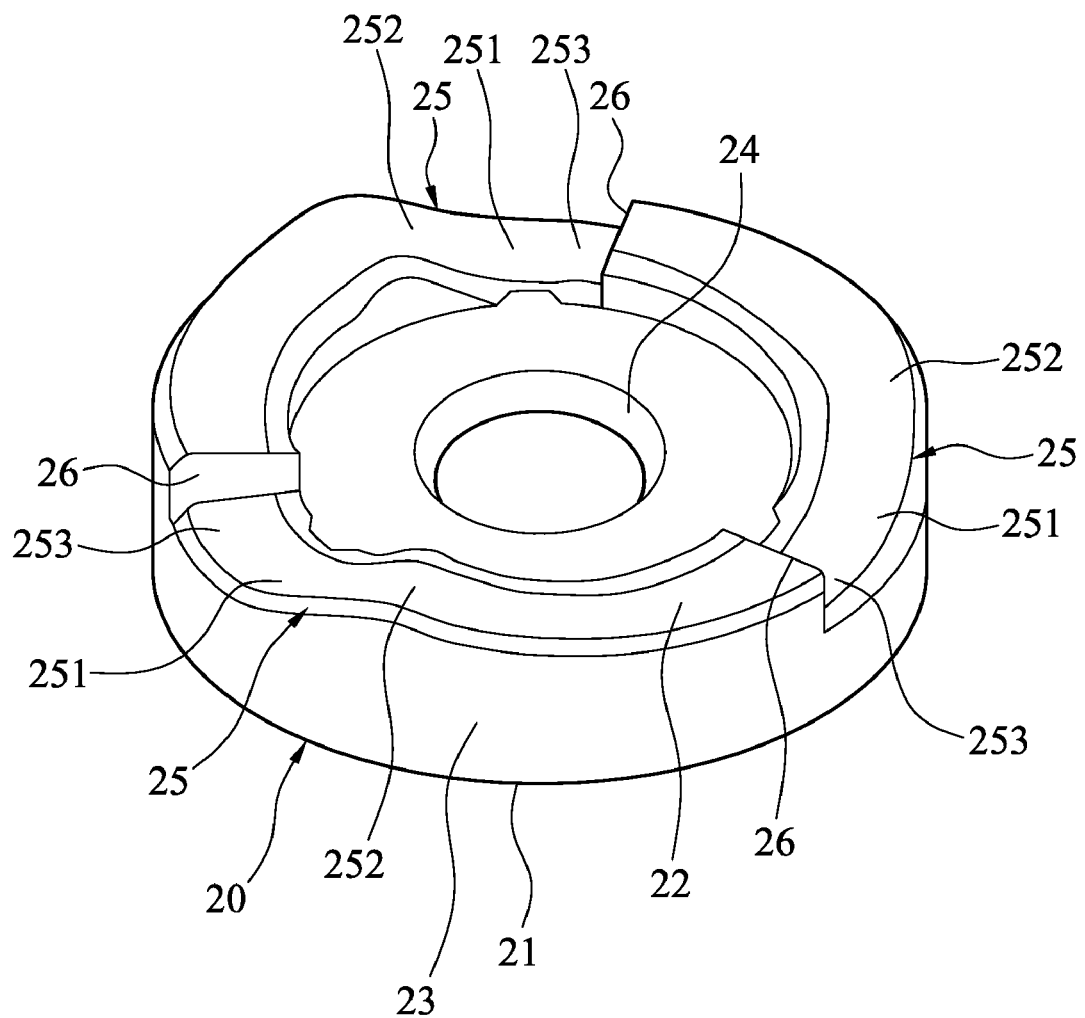
FIG. 4 is a schematic view of a first lens of the preferred embodiment.

As shown in FIGS. 3 and 4, the zoom lens assembly or the zoom lens module is assembled to a optical image device (not shown), such as a digital camera, or a projector, to execute focusing functions, which includes zooming and focusing. In a preferred embodiment, the zoom lens module comprises a first lens 20, a second lens 30, a plurality of guiding blocks 40, a plurality of linking members 50, a sheathing tube 60 and a adjusting tube 70.

The first lens 20 is made by glass molding or plastic injection molding, comprising a first lens surface 21 and a second lens surface 22 opposite to each other along an axis II. A first connecting surface 23 connects the first lens surface 21 and the second lens surface 22. A first effective radius 24 is around the axis II, and a plurality of curved surfaces 25 are disposed on the second lens surface 22 toward the first lens surface 21. A plurality of stop surfaces 26 are between a bottom 253 disposed on the curved surfaces 25 around the axis II and the second lens surface 22.

The curved surfaces 25 are disposed at intervals of equal angle. In the embodiment there are three curved surfaces 25, and each curved surface 25 comprises a slope 251, a top 252 connecting the slope 251 and the second lens surface 22, and a bottom opposite to the top 252.

The second lens 30 is made by glass molding or plastic injection molding, comprising a third lens surface 31 facing the second lens surface 22, a fourth lens surface 32 opposite to the third lens surface 31, a second connecting surface 33 connecting the third lens surface 31 and the fourth lens surface 32, a second effective radius 34 around the axis II, a plurality of second driving rod 35 disposed on the third lens surface 31 around the axis II and corresponding to the curved surfaces 25, and a plurality of radial holes respectively disposed on the second connecting surfaces 33.

In the embodiment, there are three radial holes 36 disposed at intervals of equal angel.

In the embodiment, there are three guiding blocks 40 disposed on the first connecting surface 23 of the first lens 20 at intervals of equal angle. In this embodiment, the guiding blocks 40 are integrally formed to be protruded from the connecting surfaces 23.

In the embodiment, there are three linking members 50. For example, the linking members 50 are bolts fixed in the radial holes 36 of the second lens 30. In other variant embodiments, the linking members 50 can be screws screwing into the radial holes 36.

It should be noted that the guiding blocks 40 can also be disposed on the second connecting surface 33 of the second lens 30, and the linking members 50 are fixed on the first connecting surface 23 of the first lens 20.

The sheathing tube 60 comprises an inner surface 61 and an outer surface 62 having different diameters around the axis II, a plurality of guiding notches 63 disposed on the inner surface 31 to receive the guiding blocks 40, and a plurality of slits communicating the inner surface 61 and the outer surface 62 and intersecting the axis II for the linking members 50 to pass therethrough.

The adjusting tube 70 comprises an inner surface and an outer surface having different diameters around the axis II, and a plurality of driving notches 73 disposed on the inner surface 71 around the axis II to receive the linking members 50.

Figure 5:
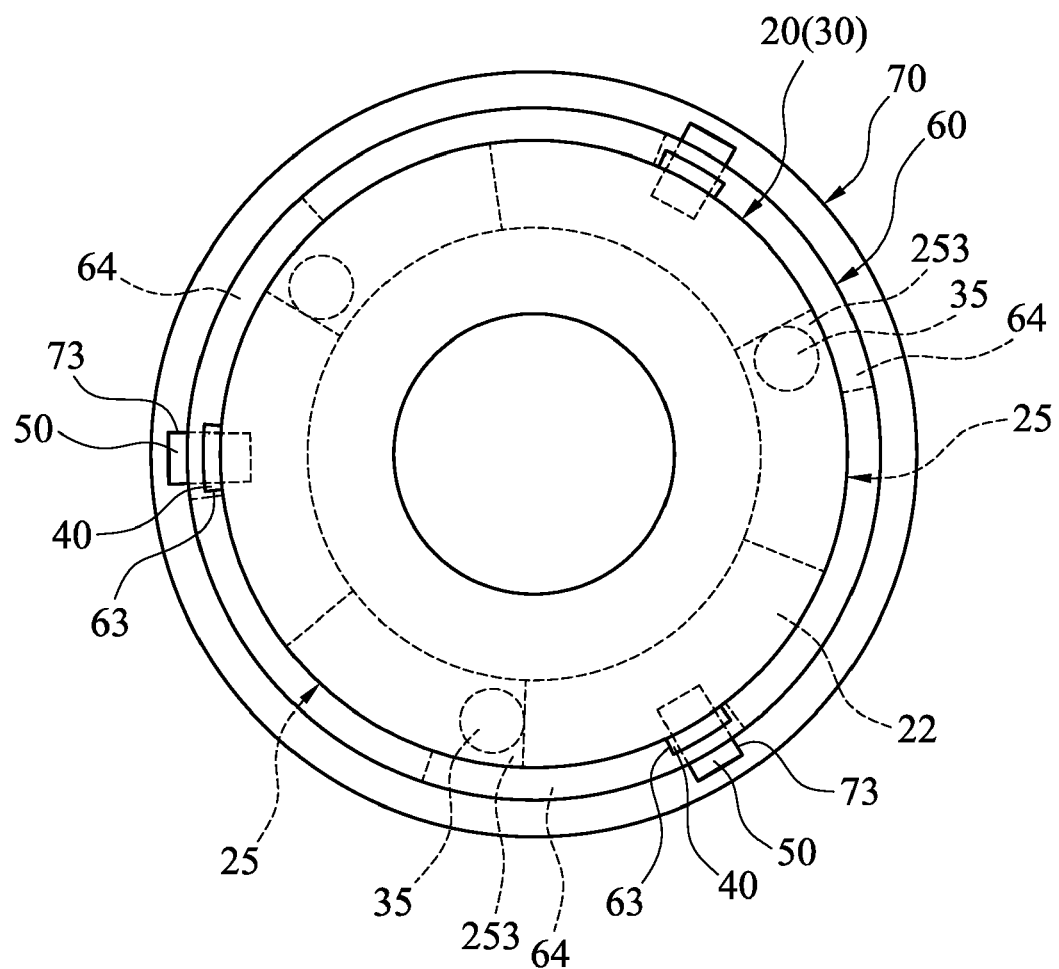
FIG. 5 is a top view of the zoom lens assembly/zoom lens module of the preferred embodiment, showing a first position of the first lens relatively to the second lens.
Figure 6:
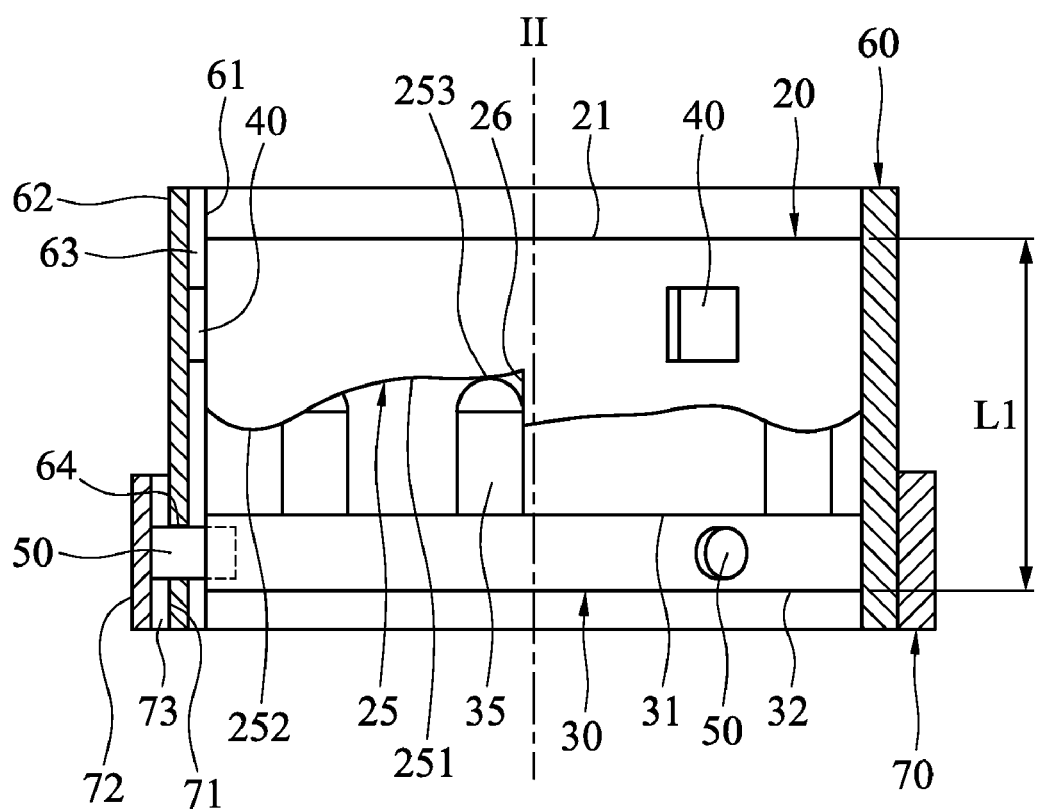
FIG. 6 is a partial sectional view of FIG. 5, showing a distance L1 between the first lens and the second lens, for clearly showing the position of a driving rod and curved surfaces, wherein a second effective radius of the second lens is omitted.

For assembling the zoom lens module, as shown in FIGS. 3, 5 and 6, the second lens surface 22 of first lens 20 is faced toward the third lens surface 31 of the second lens 30 to allow the first lens 20 contact the second lens 30, allowing the driving rods 35 to abut the second lens surfaces 22. The guiding notches 63 of the sheathing tube 60 is aligned with the guiding blocks 40, and then the first lens 20 and the second lens 30 are sheathed by the sheathing tube 60. Meanwhile, the guiding blocks 40 is in the guiding notches 63, and the first lens 20 is able to move along the axis II, but not able to rotate. Afterwards, the linking members 50 are respectively passed through the slits 64 of the sheathing tube 60 to be fixed in the radial holes 36. Finally, the driving notches 73 of the adjusting tube 70 is aligned with the linking members 50, and then the sheathing tube 60 is sheathed by the adjusting tube 70 along the axis II. Meanwhile, the linking members 50, passed through the slits 64, are in the driving notches 73, and the second lens 30 is able to rotate, but not able to move.

Figure 7:
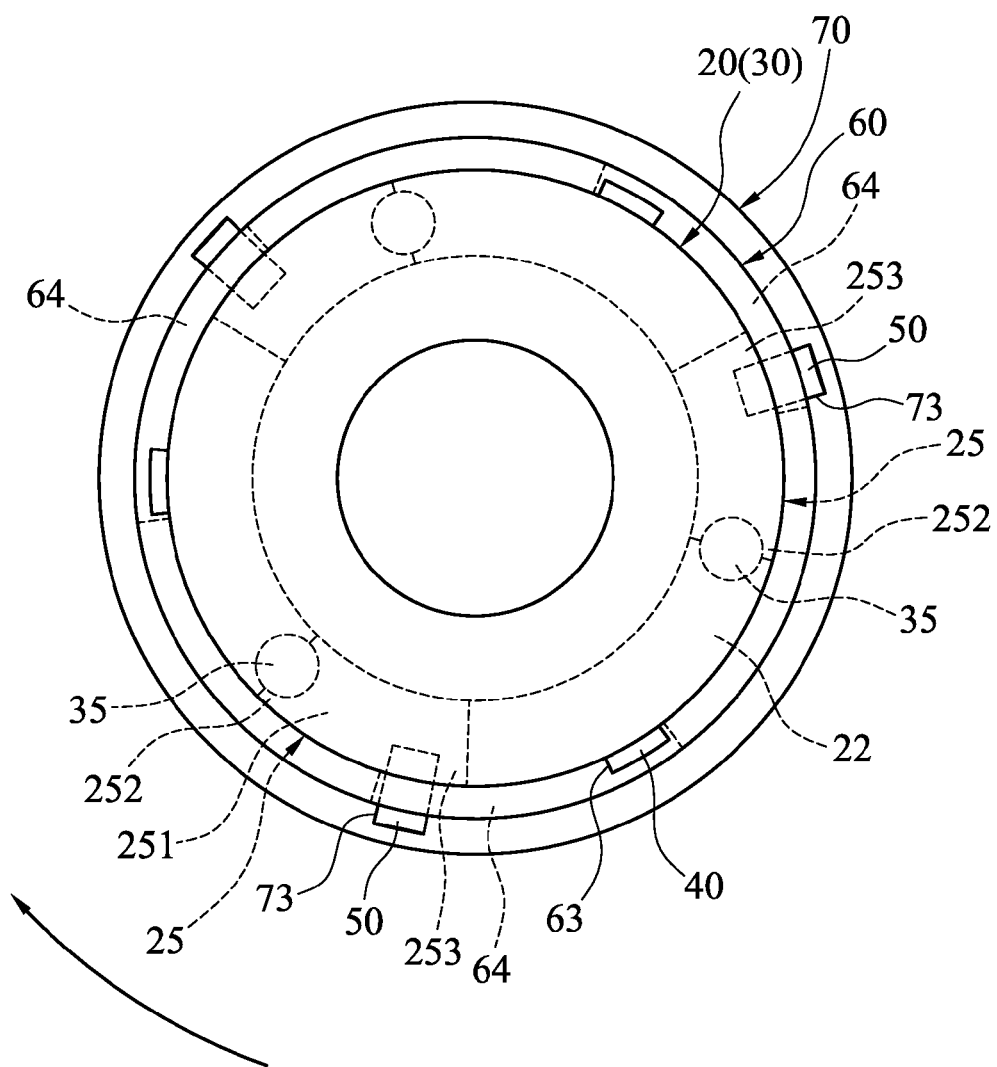
FIG. 7 is a top view of the zoom lens assembly/zoom lens module of the preferred embodiment, showing a second position of the first lens relatively to the second lens.
Figure 8:
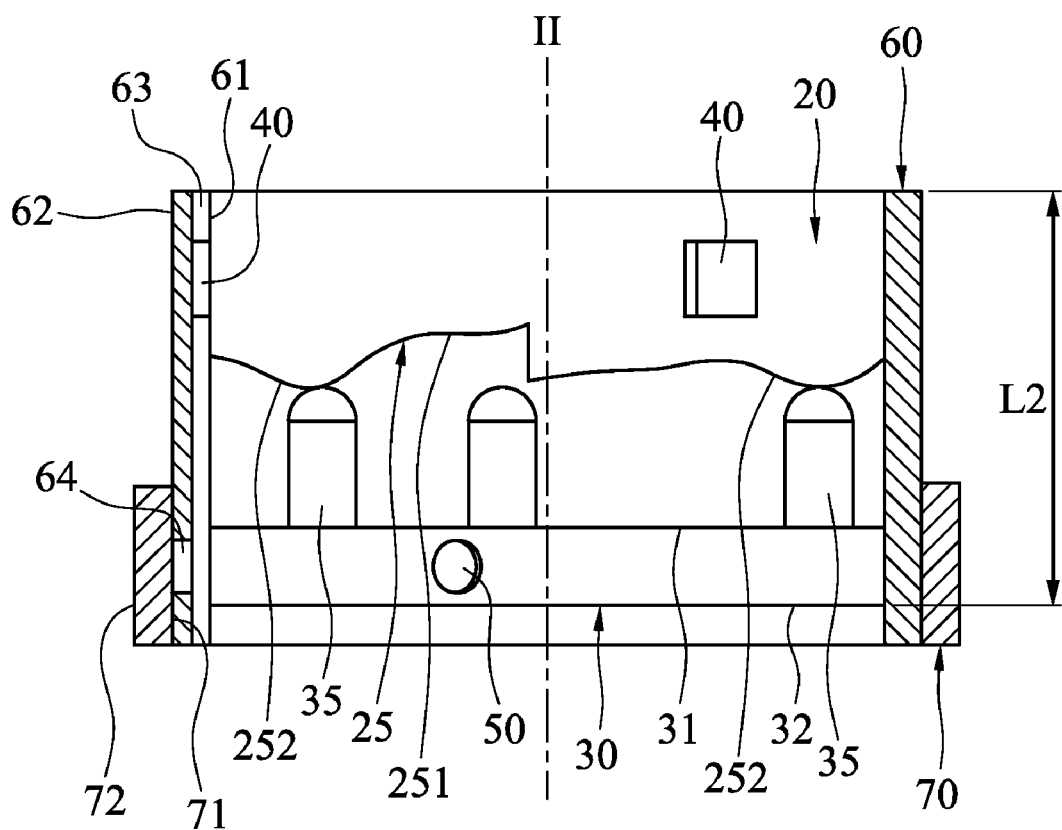
FIG. 8 is a partial sectional view of FIG. 5, showing a distance L2 between the first lens and the second lens.

When the driving rods 35 abut the bottom 253 of the curved surfaces 25, a distance between the first lens 20 and the second lens 30 is L1. As shown in FIGS. 5 and 6, to operate the zoom lens module, only the adjusting tube 70 is rotated to adjust the distance between the first lens 20 and the second lens 30 in order to achieve zooming effects. When the adjusting tube 70 is rotated, the driving notches 73 drive the linking members 50 to rotate in the slits 64. The second lens 30 is rotated simultaneously to move the driving rods 35 toward the top 252 along the slopes 251 of the curved surfaces 25. Because the second lens 30 only rotates around the axis II, and does not move along the axis II, and the first lens 20 only moves along the axis II, and does not rotate around the axis II, the first lens 20 becomes a passive member to move away from the second lens 30 along the axis II. Thus, the distance between the first lens 20 and the second lens 30 thereafter becomes L2, as shown in FIGS. 7 and 8.

It should be noted that when the adjusting tube 70 is rotated reversely, the driving rods 35 move towards the bottom 253 along the slopes 251 of the curved surfaces 25. The drive rods 35 are stopped by the stop surfaces 26 to control the rotation of the adjusting tube 70.

Figure 9:
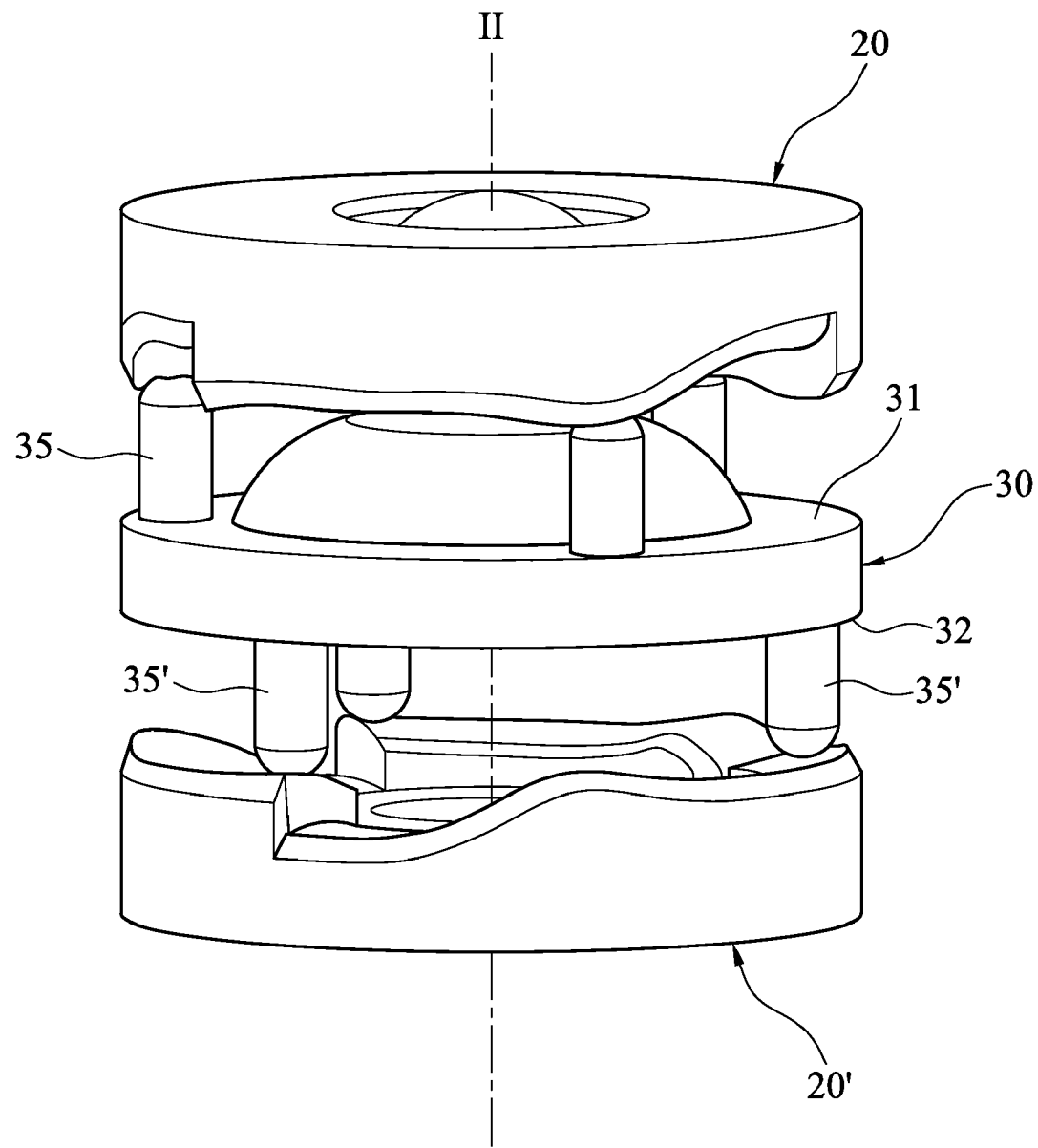
FIG. 9 is a side view of the zoom lens assembly/zoom lens module of the preferred embodiment, showing the assembly/zoom lens module with another first lens.

As shown in FIG. 9, a plurality of driving rods 35' can be disposed on the fourth lens surface 32 of the second lens 30, and another first lens 20' can also be assembled thereon. Therefore, when the second lens 30 rotates around the axis II, the two first lenses 20, 20' are driven to move along the axis II.

Accordingly, the zoom lens assembly and the zoom lens module comprise the following functions and advantages to achieve purposes of the invention.

First, the zoom lens assembly of the invention only comprises the first lens 20 and the second lens 30, and only the first lens 20 or the second 30 is rotated to drive the first lens 20 or the second lens 30 to move along the axis II in order to change the distance between the first lens 20 and the second lens 30, generating zooming effects. The present invention is advantageous in that it reduces the amount of the components required, thus decreasing manufacturing costs.

Second, the first lens 20 and the second lens 30 of the zoom lens module of the invention are not disposed in the space of the frame set, such that the radial size is therefore reduced. Thus, the present invention is advantageous in that it reduces the overall size of the zoom lens module.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zoom lens assembly, comprising:
   a first lens comprising a first lens surface and a second lens surface opposite to each other along an axis, a first effective radius around the axis, and a plurality of curved surfaces disposed on the second lens surface toward the first lens surface; and
   a second lens disposed on a side of the first lens along the axis, comprising a third lens surface facing the second lens surface, a fourth lens surface opposite to the third lens surface, a second effective radius around the axis, and a plurality of first driving rods disposed on the third lens surface and abutting the curved surfaces,
   wherein the first lens and the second lens rotate relatively along the axis to generate zoom effect.

2. The zoom lens assembly as claimed in claim 1, wherein each of the curved surfaces of the first lens respectively comprises a slope, a top connecting the slope and the second lens surface, and a bottom disposed opposite to the top.

3. The zoom lens assembly as claimed in claim 2, wherein the first lens further comprises a plurality of stop surfaces disposed between the bottom and the second lens surface.

4. The zoom lens assembly as claimed in claim 1, wherein the second lens further comprises a plurality of second driving rods disposed on the fourth lens surface, and the zoom lens assembly further comprises another first lens assembled adjacent to the fourth lens surface along the axis.

5. A zoom lens module, comprising:
   a first lens comprising a first lens surface and a second lens surface opposite to each other along an axis, a first connecting surface connecting the first lens surface and the second lens surface, a first effective radius around the axis, and a plurality of curved surfaces disposed on the second surface toward the first lens surface;
   a second lens disposed on a side of the first lens along the axis, comprising a third lens surface facing the second lens surface, a fourth lens surface opposite to the third lens surface, a second connecting surface connecting the third lens surface and the fourth lens surface, a second effective radius around the axis, and a plurality of driving rods disposed on the third lens surface and abutting the curved surfaces;
   a plurality of guiding blocks fixed on one of the first connecting surface and the second connecting surface;
   a sheathing tube sheathing the first lens and the second lens, comprising an inner surface and an outer surface having different diameters, a plurality of guiding notches disposed on the inner surface along the axis to receive the guiding blocks, and a plurality of slits communicating the outer surface with the inner surface;
   a plurality of linking members passing through the slits along a radial direction and fixed on another one of the first connecting surface and the second connecting surface; and
   an adjusting tube sheathing the sheathing tube, comprising an inner surface and an outer surface having different diameters, and a plurality of driving notches disposed on the inner surface of the adjusting tube along the axis to receive the linking members.

6. The zoom lens module as claimed in claim 5, wherein the guiding blocks are fixed on the first connecting surface, and the linking members are fixed on the second connecting surface.

7. The zoom lens module as claimed in claim 6, wherein the second lens further comprises a plurality of radial holes disposed on the second connecting surface to fix the linking members therein.

8. The zoom lens module as claimed in claim 5, wherein each of the curved surfaces of the first lens comprises a slope, a top connecting the slope and the second lens surface and a bottom disposed opposite to the top.

9. The zoom lens module as claimed in claim 8, wherein the first lens further comprises a plurality of stop surfaces disposed between the bottom and the second lens surface.

* * * * *